US010612464B2

(12) United States Patent
Prasad et al.

(10) Patent No.: US 10,612,464 B2
(45) Date of Patent: Apr. 7, 2020

(54) FLUTTER INHIBITING INTAKE FOR GAS TURBINE PROPULSION SYSTEM

(71) Applicant: UNITED TECHNOLOGIES CORPORATION, Farmington, CT (US)

(72) Inventors: Dilip Prasad, North Granby, CT (US); Bruce L. Morin, Longmeadow, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 567 days.

(21) Appl. No.: 15/452,634

(22) Filed: Mar. 7, 2017

(65) Prior Publication Data

US 2018/0258857 A1 Sep. 13, 2018

(51) Int. Cl.
F02C 7/045 (2006.01)
F02K 1/82 (2006.01)
G10K 11/172 (2006.01)
F01D 25/06 (2006.01)
B64D 33/02 (2006.01)

(52) U.S. Cl.
CPC ............. F02C 7/045 (2013.01); F01D 25/06 (2013.01); B64D 2033/0206 (2013.01); F05D 2260/96 (2013.01)

(58) Field of Classification Search
None
See application file for complete search history.

(56) References Cited

U.S. PATENT DOCUMENTS

| 3,611,724 | A | | 10/1971 | Kutney |
| 3,637,140 | A | | 1/1972 | Palovchik |
| 4,084,366 | A | * | 4/1978 | Saylor ............... B29D 24/005 52/791.1 |
| 4,235,303 | A | | 11/1980 | Dhoore et al. |
| 4,291,080 | A | | 9/1981 | Ely et al. |
| 4,313,524 | A | | 2/1982 | Rose |

(Continued)

FOREIGN PATENT DOCUMENTS

| EP | 2017826 A2 | 1/2009 |
| EP | 2251535 A2 | 11/2010 |

(Continued)

OTHER PUBLICATIONS

European Search Report for Application No. 18160554.4-1007; dated Jul. 19, 2018; 7 pgs.

(Continued)

Primary Examiner — Jason D Shanske
Assistant Examiner — Jason G Davis
(74) Attorney, Agent, or Firm — Cantor Colburn LLP

(57) ABSTRACT

Disclosed is a flutter damper including a first plurality of chambers configured for peak acoustical energy absorption at a frequency range that is associated with a first fan flutter mode, the first plurality of chambers in fluid communication with a flow surface, and a second plurality of chambers configured for peak acoustical energy absorption at a frequency range that is associated with a second fan flutter mode, the second plurality of chambers in fluid communication with the flow surface, and wherein the first plurality of chambers and second plurality of chambers are disposed in a grid pattern.

8 Claims, 7 Drawing Sheets

(56) References Cited

U.S. PATENT DOCUMENTS

| | | | |
|---|---|---|---|
| 4,441,578 A | 4/1984 | Rose | |
| 4,452,335 A | 6/1984 | Mathews et al. | |
| 4,531,362 A | 7/1985 | Barry et al. | |
| 4,692,091 A | 9/1987 | Ritenour | |
| 4,967,550 A | 11/1990 | Acton et al. | |
| 5,005,353 A | 4/1991 | Acton et al. | |
| 5,025,888 A | 6/1991 | Arcas et al. | |
| 5,382,134 A | 1/1995 | Pla et al. | |
| 5,415,522 A | 5/1995 | Pla et al. | |
| 5,498,127 A | 3/1996 | Kraft et al. | |
| 5,590,849 A | 1/1997 | Pla | |
| 5,594,216 A | 1/1997 | Yasukawa et al. | |
| 5,919,029 A | 7/1999 | Van Nostrand et al. | |
| 5,979,593 A | 11/1999 | Rice et al. | |
| 6,085,865 A | 7/2000 | Delverdier et al. | |
| 6,379,110 B1 | 4/2002 | McCormick et al. | |
| 6,634,457 B2 | 10/2003 | Paschereit et al. | |
| 6,811,372 B1 | 11/2004 | Emborg et al. | |
| 6,837,050 B2 | 1/2005 | Mandai et al. | |
| 7,857,093 B2 | 12/2010 | Sternberger et al. | |
| 7,870,929 B2 | 1/2011 | Farstad | |
| 8,434,995 B2 | 5/2013 | Pool et al. | |
| 8,578,697 B2 | 11/2013 | Harper | |
| 8,931,588 B2 | 1/2015 | Murray | |
| 9,097,179 B2 | 8/2015 | Brooks et al. | |
| 9,181,875 B2 | 11/2015 | Busekros et al. | |
| 9,546,558 B2 | 1/2017 | Lee et al. | |
| 10,066,548 B2 * | 9/2018 | Gilson | F01D 25/24 |
| 2004/0045767 A1 | 3/2004 | Byrne et al. | |
| 2005/0109557 A1 | 5/2005 | Dravet et al. | |
| 2005/0274103 A1 | 12/2005 | Prasad et al. | |
| 2005/0284690 A1 | 12/2005 | Proscia et al. | |
| 2006/0037809 A1 | 2/2006 | Fuller et al. | |
| 2008/0296431 A1 | 12/2008 | Ivers | |
| 2009/0110541 A1 | 4/2009 | Southwick et al. | |
| 2009/0293481 A1 | 12/2009 | Bethke | |
| 2010/0206664 A1 | 8/2010 | Bagnall | |
| 2010/0284788 A1 | 11/2010 | Brooks et al. | |
| 2010/0284789 A1 | 11/2010 | Brooks et al. | |
| 2011/0220433 A1 | 9/2011 | Nakamura et al. | |
| 2011/0266917 A1 | 11/2011 | Metzger et al. | |
| 2012/0124965 A1 | 5/2012 | Grabowski et al. | |
| 2014/0169935 A1 | 6/2014 | Schwarz et al. | |
| 2014/0233769 A1 | 8/2014 | Storm | |
| 2014/0366554 A1 | 12/2014 | Gilson et al. | |
| 2016/0076453 A1 | 3/2016 | Rolls-Royce | |
| 2016/0194968 A1 | 7/2016 | Murphy et al. | |
| 2016/0298847 A1 | 10/2016 | Nguyen et al. | |
| 2017/0022826 A1 | 1/2017 | Read et al. | |
| 2017/0058780 A1 * | 3/2017 | Kim | F02C 9/18 |
| 2018/0209345 A1 | 7/2018 | Fulayter et al. | |
| 2018/0258788 A1 | 9/2018 | Morin et al. | |
| 2018/0258854 A1 | 9/2018 | Sidelkovskly et al. | |
| 2018/0258855 A1 | 9/2018 | Michaels et al. | |
| 2018/0258856 A1 | 9/2018 | Schwarz et al. | |
| 2018/0258955 A1 | 9/2018 | Levasseur et al. | |
| 2018/0258956 A1 | 9/2018 | Marchaj | |

FOREIGN PATENT DOCUMENTS

| | | |
|---|---|---|
| EP | 2256302 A1 | 12/2010 |
| EP | 2466095 A2 | 6/2012 |
| EP | 3187713 A1 | 7/2017 |
| EP | 3333402 A1 | 6/2018 |
| GB | 2090334 A | 7/1982 |
| WO | 9213339 A1 | 8/1992 |
| WO | 2014189572 A2 | 11/2014 |

OTHER PUBLICATIONS

European Search Report for Application No. 18160541.1-1007; dated Jul. 19, 2018; 6 pgs.

European Search Report for Application No. 18160550.2-1007; dated Jul. 19, 2018; 7 pgs.

European Search Report for Application No. 18160552.8-1007; dated Jul. 3, 2018; 12 pgs.

European Search Report for Application No. 18160556.9-1007; dated Jul. 24, 2018; 7 pgs.

European Search Report for Application No. 18160559.3-1007; dated Jul. 24, 2018; 7 pgs.

European Search Report for Application No. 18160561.9; dated Jul. 4, 2018; 10 pgs.

Mustafi, Prateek; "Improved Turbofan Intake Liner Design and Optimization"; Feb. 12, 2013; Theisis paper Faculty of Engineering and the Enviroment, Institute of Sound and Vibration Research; Univeristy of Southampton; 196 pages.

* cited by examiner

FLUTTER INHIBITING INTAKE FOR GAS TURBINE PROPULSION SYSTEM

BACKGROUND

Exemplary embodiments pertain to flutter dampers in gas turbine propulsion systems and, more particularly, to flutter dampers in nacelle inlet structures.

Geared turbofan architectures, allow for high bypass ratio turbofans, enabling the use of low pressure ratio fans, which may be more susceptible to fan flutter than high pressure ratio fans. Fan flutter is an aeromechanical instability detrimental to the life of a fan blade.

Accordingly, there is a need for a flutter damper which, by absorbing the acoustic energy associated with the flutter structural mode, may prevent the fan from fluttering, and which may be integrated into the reduced available space in an optimized propulsion system.

BRIEF DESCRIPTION

Disclosed is a flutter damper including a first plurality of chambers configured for peak acoustical energy absorption at a frequency range that is associated with a first fan flutter mode, the first plurality of chambers in fluid communication with a flow surface, and a second plurality of chambers configured for peak acoustical energy absorption at a frequency range that is associated with a second fan flutter mode, the second plurality of chambers in fluid communication with the flow surface, and wherein the first plurality of chambers and second plurality of chambers are disposed in a grid pattern.

In addition to one or more of the features described above, or as an alternative, further embodiments may include that the grid pattern is an alternating checkerboard pattern.

In addition to one or more of the features described above, or as an alternative, further embodiments may include that the first plurality of chambers and second plurality of chambers are circumferentially intermixed along at least one annular row.

In addition to one or more of the features described above, or as an alternative, further embodiments may include that the first plurality of chambers and second plurality of chambers are axially and circumferentially intermixed, along a plurality of axially adjacent annular rows, to form the checkerboard pattern.

In addition to one or more of the features described above, or as an alternative, further embodiments may include that the chambers have an elliptically shaped portion, for which a minor axis for the first plurality of chambers and a major axis for the second plurality of chambers are disposed along a nacelle axial direction.

In addition to one or more of the features described above, or as an alternative, further embodiments may include that the elliptically shaped portion of the chambers is spaced from the flow surface by a cylindrically shaped neck portion.

In addition to one or more of the features described above, or as an alternative, further embodiments may include that the chambers in the first plurality of chambers have a greater volume than the chambers in the second plurality of chambers.

Further disclosed is a gas turbine propulsion system including a nacelle, and a flutter damper secured to the nacelle. The flutter damper has one or more of the above features.

Further disclosed is a method of providing flutter damping to a gas turbine engine, including absorbing acoustic energy with a first plurality of chambers configured for peak acoustical energy absorption at a frequency range that is associated with a first fan flutter mode, and absorbing acoustic energy with a second plurality of chambers configured for peak acoustical energy absorption at a frequency range that is associated with a second fan flutter mode, and wherein the first plurality of chambers and second plurality of chambers are disposed in a grid pattern.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
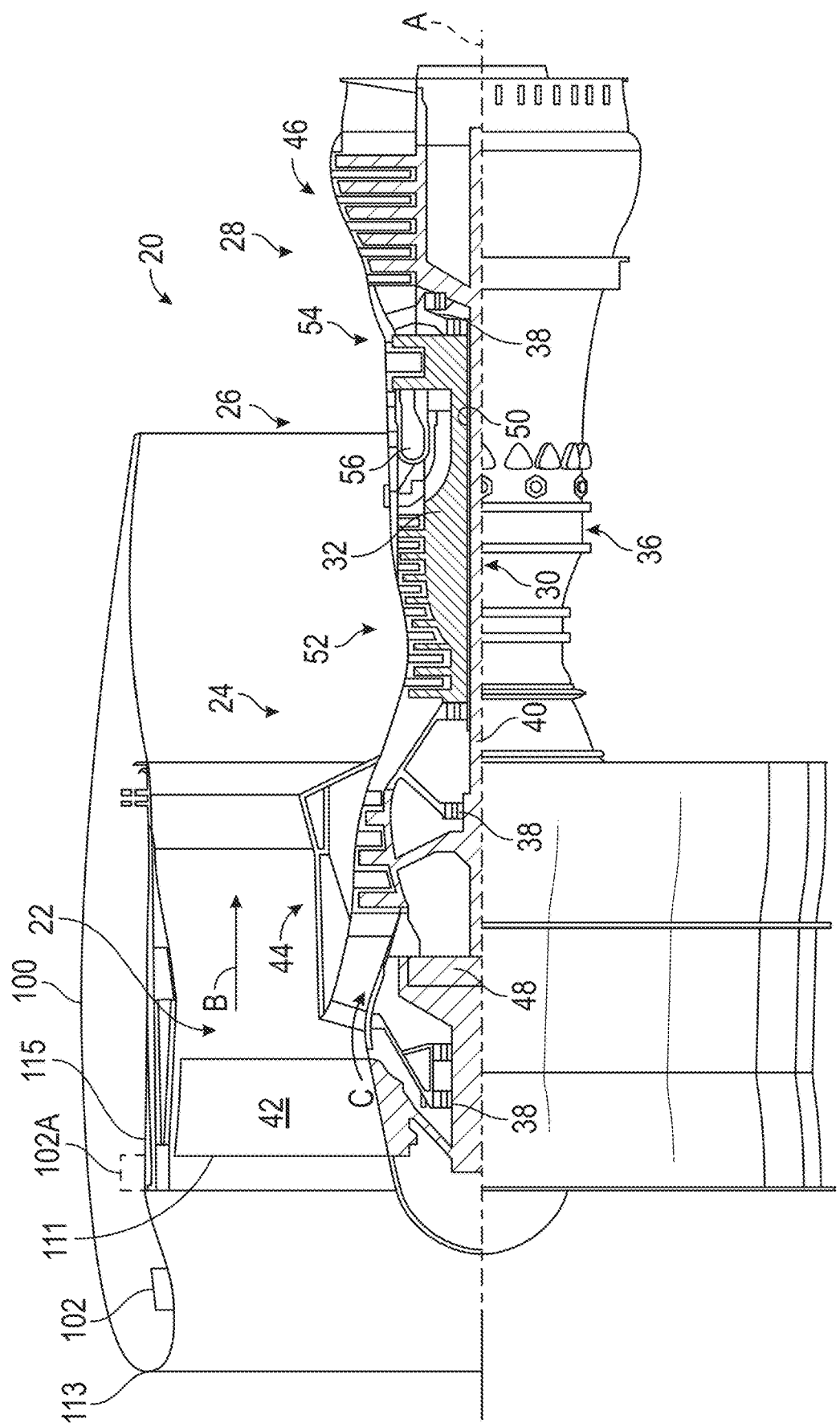
FIG. 1 is a schematic view of a gas turbine propulsion system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via multiple bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° \ R)/(518.7° \ R)]^{0.5}$. The "Low corrected fan tip speed" as disclosed herein according to one non-limiting embodiment is less than about 1150 ft/second (350.5 m/sec).

Figure 2:
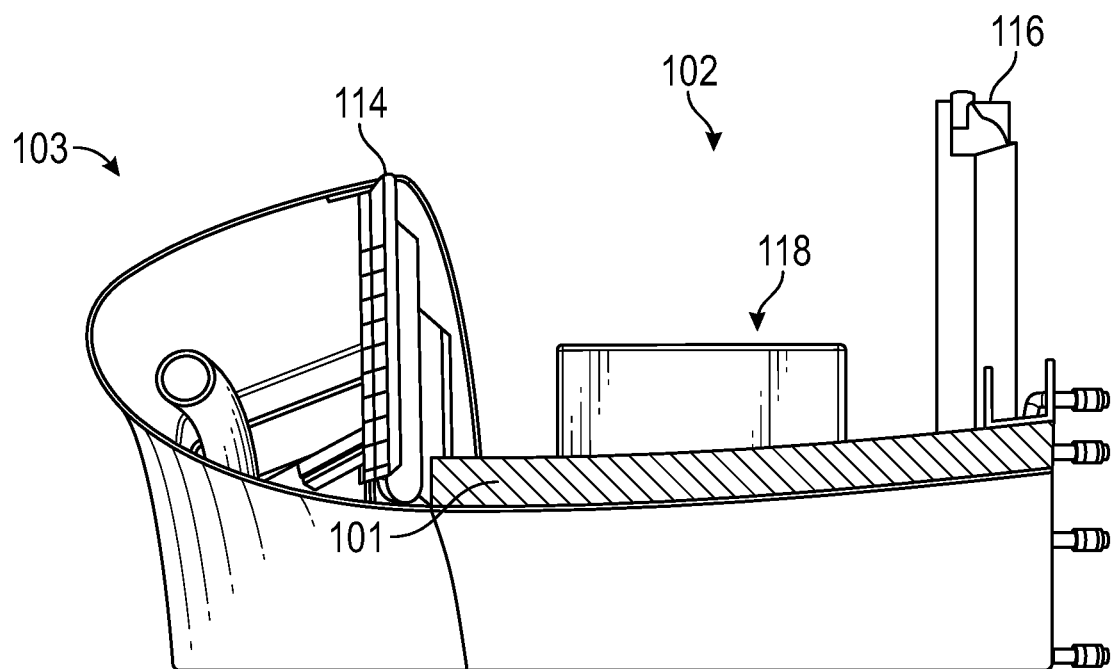
FIG. 2 illustrates a perspective cross sectional view of a flutter damper in a nacelle inlet.
Figure 3:
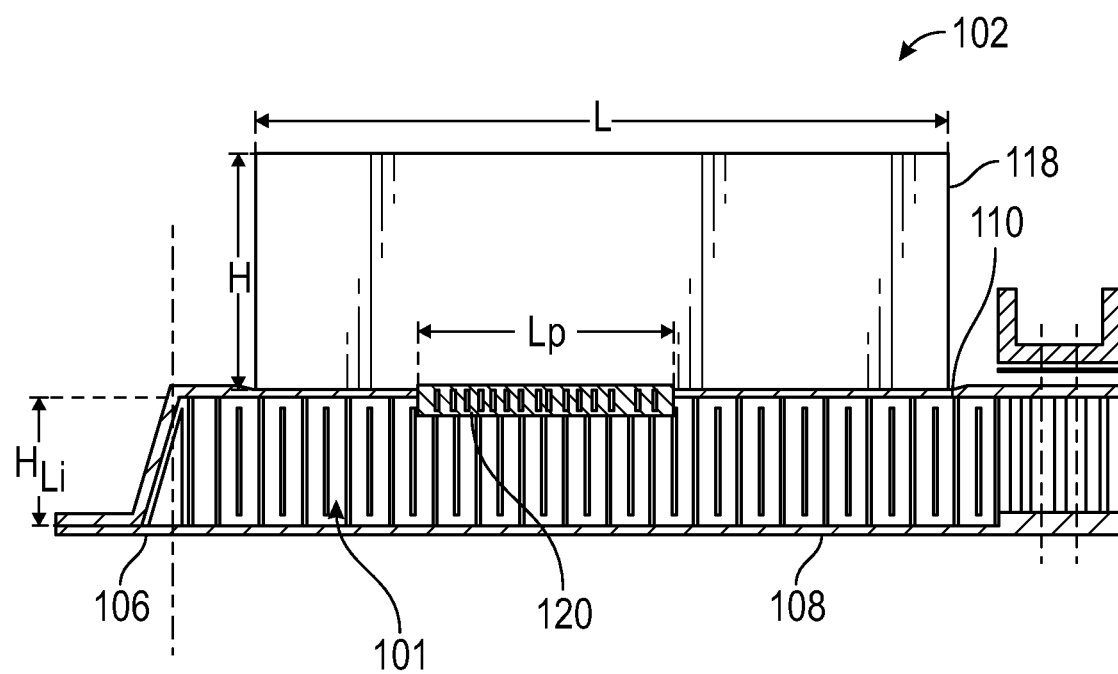
FIG. 3 is a schematic view of a flutter damper in accordance with one embodiment of the disclosure.

As illustrated in FIGS. 1 through 3, the engine 20 may include a nacelle 100 with acoustic liner 101 at the radial inside of the nacelle inlet skin 106. The acoustic liner 101 may have a perforated radial inner face sheet 108, i.e., facing a radial inside of a nacelle inlet 103, illustrated in FIG. 2, and a radial outer back sheet 110.

The acoustic liner 101 is designed to absorb energy that tends to produce community noise. As such, for contemporary high bypass ratio propulsion systems, the acoustic liner 101 typically provides for peak energy absorption in the acoustic frequency range of about between 500 and 2000 Hz, and is less effective outside this range. Fan flutter for such propulsion systems, however, typically occurs at a lower frequency, depending on the frequency and nodal diameter count of the critical structural mode. The structural frequency largely depends on the size of the fan, among other design parameters. Large fans tend to flutter at smaller frequencies than small fans. Torsion modes tend to have higher frequency than bending modes on any given fan, and either can be critical. The materials and construction techniques used to make the fan blades also have a significant influence on the frequency. Given the range of sizes, materials, and flutter critical modes in fans of modern gas turbine engines, the flutter frequency will typically occur at a frequency range of less than but not equal to 500 Hz, and more specifically between 50 and 400 Hz, yet more specifically between 50 and 300 Hz, and yet more specifically between 50 and 200 Hz.

In one embodiment, a flutter damper 102 is provided which may include the acoustic liner 101 and a chamber 118 disposed radially exterior to and in acoustic communication with the acoustic liner 101. Also a flutter damper 102 without the acoustic liner 101 is considered part of the scope of this disclosure. As used herein, radially refers to the axis A of the engine 20. Acoustic communication is provided through a perforation section 120 in the outer back sheet 110. In FIG. 2, the flutter damper 102 is illustrated as being disposed between a first axial forward nacelle bulkhead 114 and a second axial forward nacelle bulkhead 116. The flutter damper 102, however, may be disposed anywhere between a leading edge 111 of the fan 42 and a nacelle hilite 113, such as flutter damper 102A disposed on the fan case 115 illustrated in FIG. 1.

The flutter damper 102 may be configured to mitigate fan flutter by providing peak energy absorption in the acoustic frequency range associated with fan flutter modes, where such frequency range is referred to herein as a flutter frequency range. The flutter damper may have desirable impedance characteristics at certain targeted flutter frequencies, which may be defined as:

$$f_{target} = f_{S,ND} + \Omega \cdot ND$$

In the equation above, the variable $f_{S,ND}$ is the frequency, which is measured in units of Hertz, and which corresponds to a resonance frequency of a structural mode of the fan blade, which typically may be a first or second bending mode with a certain nodal diameter count, ND. The variable ND is the nodal diameter count of the circumferential pattern of the structural mode of the fan blade. The variable Ω is the rotational speed of the fan, which is measured in the units of revolutions per second. The values for variable Ω may be chosen to correspond to conditions where fan flutter may typically occur, for example, when the tip relative Mach number of the fan is between 0.85 and 1.2 during standard-day, sea-level-static operation.

From the above equation, considering the nodal diameter constraints, the targeted flutter frequency ranges may be defined to be:

$f_{S,ND}$=frequency of first or second bending mode of fan with ND nodal diameters

1≤ND≤3

$\Omega_{Mreltip=0.85} \leq \Omega \leq \Omega_{Mreltip=1.2}$ $f_{target}=f_{S,ND}+\Omega \cdot ND$ In the above equation, Mreltip is the tip relative Mach number for a radial outer tip of the fan blade, and the bending mode is a vibrational mode of the fan blade. The symbol $\Omega_{Mreltip=0.85}$ denotes the rotational speed where the tip relative Mach number is equal to 0.85; likewise, $\Omega_{Mreltip=1.2}$ denotes the rotational speed where the tip relative Mach number is equal to 1.2, Of course, values greater or lesser than the aforementioned values are considered to be within the scope of the present disclosure.

Within the flutter frequency ranges associated with the first and second bending mode, and more specifically at the targeted frequencies, the flutter damper may have the following impedance characteristics:

R≥2ρc

−3ρc≤X≤−0.6ρc

Again, these values may vary and fall within the scope of the present disclosure. The above equation references the impedance of the flutter damper, defined as the complex ratio of the amplitude and phase of pressure oscillations over the amplitude and phase of the acoustic velocity as a function of frequency. In addition, the equation references the real part of impedance is the resistance, which is variable R, and the imaginary part of impedance is the reactance, which is variable X. The variable ρ is the air density, and the variable c is the sound speed, both being at the entrance to the flutter damper. The resistance constraint on R may facilitate integration of the flutter damper into acoustic liners, which typically have R values greater than 2ρc in locations forward of the fan. The reactance constraint on X optimizes the flutter inhibiting capability of the device at operating conditions typically encountered in commercial aircraft applications. At certain target frequencies, the flutter damper may satisfy the following additional constraint:

$$0.0143 \leq \frac{Vf_{target}}{Sc} \leq 0.165$$

Figure 4A:
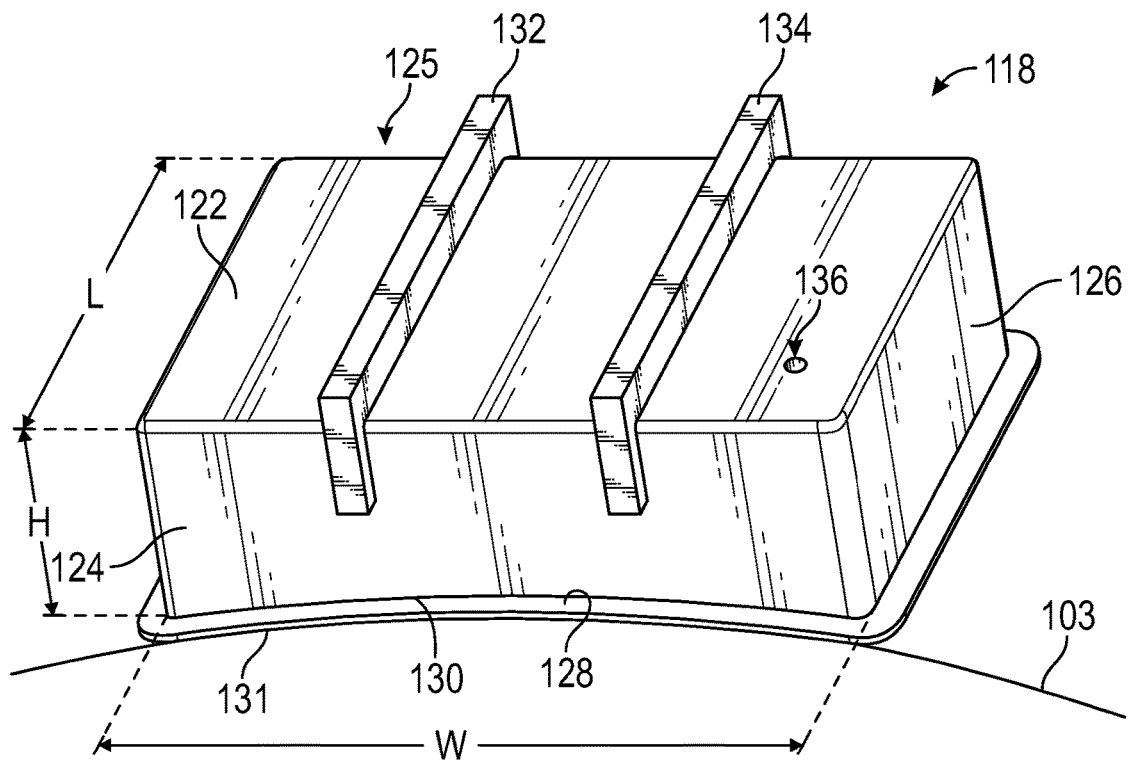
FIGS. 4A and 4B illustrate perspective views of one chamber of a flutter damper in accordance with one embodiment of the disclosure.
Figure 4B:
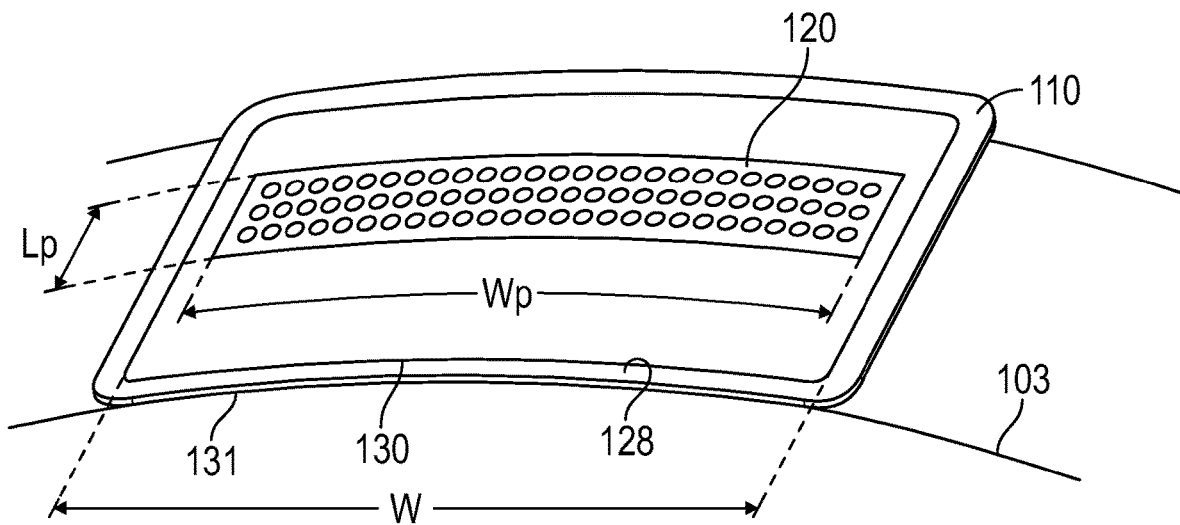

Again, these Values may vary and fall within the scope of the present disclosure. As illustrated in FIGS. 3, 4A and 4B, discussed in greater detail below, the chamber 118 has a width W, a height H, and a length. L. In addition, the perforated section 120 disposed under the chamber 118 has a width Wp and a length Lp, and the acoustic liner 101 has a height $H_{Li}$. Thus, in the above equation, the volume of the flutter damper 102, which includes the volume (W×H×L) of chamber 118 and the volume (Wp×$H_{Li}$×Lp) of the acoustic liner 101 is variable V. The area of the perforated section 120 (Wp×Lp) disposed under the chamber 118 is variable S. The units of V, S, c and $f_{target}$ are chosen such that (V$f_{target}$)/Sc is non-dimensional.

Moreover, in one embodiment, a downstream edge of the chamber 118 may be located at B/D≤0.35. In this equation, the variable B is the distance between the downstream edge of the chamber 118 and the fan tip leading edge, and the variable D is the fan tip diameter at the leading edge of the fan blade.

Remaining with FIGS. 1-3, the illustrated flutter damper 102 designed according to the above constraints, has the benefit of being able to fit within smaller footprints of sized-optimized propulsion systems, providing a retrofit-table solution to an existing engine inlet. Thus the disclosed flutter damper 102 may help boost fan flutter margin without requiring an inlet redesign. In addition, the flutter damper 102 may provide a relatively lightweight solution, that is, the low temperatures of the inlet area may allow for the use of a metallic material, including aluminum, or a plastic or a composite, or a hybrid metallic and non-metallic material. Moreover, the flutter damper 102 may have a scalable design which can be oriented in an array of chambers, discussed in detail, below, and as illustrated in at least FIG. 5. For example, the array of chambers and may be placed around an engine inlet circumference to achieve a desired amount of flutter dampening volume.

As illustrated in FIG. 4B, the perforation section 120 in the outer back sheet 110 may be rectangular in shape with length Lp and width Wp, where the length direction Lp corresponds to the engine axial direction, and the width direction Wp corresponds to the engine circumferential direction, For a contemporary high bypass ratio propulsion system, which may have a fan diameter of about 80 inches, and a fan rotor hub-to-tip ratio of about 0.3, the length Lp may be about four and half (4.5) inches for the chamber 118, and the width Wp may be about twelve (12) inches for chamber 118. Each perforation section 120 may have a hole-diameter of about thirty thousandths (0.030) of an inch. Of course, dimensions greater or lesser than the aforementioned dimensions are considered to be within the scope of the present disclosure. This perforation geometry provides an open area that may be about four and half (4.5) percent of the surface area (Lp×Wp) of the chamber 118 against the outer back sheet 110, which may be the same open area as a perforation section (not illustrated) in the inner face sheet 108. Again, these dimensions may vary and remain within the scope of the present disclosure.

The chamber 118 may be sized to optimally dampen fan flutter at a specific fan flutter frequency and nodal diameter. The nodal diameter count represents the nodal lines of vibrational modes observed for the fan blade, which typically may be between 1 and 3. The chamber 118 in FIG. 2, for example, is shaped as a rectangular box, and may be sized based on an observed flutter frequencies and nodal diameters for a given engine. For example, if an engine has an observable flutter mode at a frequency of about 150 Hz with nodal diameter 2, the chamber 118 may be sized according to that flutter mode and nodal diameter.

The box shape, as illustrated in FIG. 4A, may have a top surface 122 roughly defined by a width-length (W×L) area, where the length direction L corresponds to the engine axial direction, and the width direction W corresponds to the engine circumferential direction. The box shape may also have a front surface 124 and a back surface 125, each roughly defined by a height-width (H×W) area, where the height direction H for the chamber 118 may correspond to an engine radial direction. The box shape may farther have a side surface 126 roughly defined by a height-length (H×L) area. Again, these dimensions may vary and remain within the scope of the present disclosure.

For the exemplary embodiment, the chamber 118 is twelve (12) inches wide, as referenced above, and the chamber width-height-length (W×H×L) volume may be three hundred twenty four (324) cubic inches, and the height H may be equal to, or less than, six (6) inches.

Turning now to FIGS. 4A and 4B, the box shaped chamber 118 may have a bottom edge 128 that geometrically conforms to the annular and axial profile shape of the nacelle inlet 103. Extending axially and circumferentially outwardly from the bottom edge 128 of the chamber 118 is a mounting flange 130 for affixing the chamber 118 to an existing nacelle inlet 103. As such, the bottom face 131 of the chamber 118 may be formed by the radial outer back sheet 110 of the acoustic liner 101.

The chamber 118 may also include first and second stiffening structures 132, 134. The stiffening structures 132, 134 may have a substantially "C" shape, when viewing into the side surface 126 of the chamber 118, which protrudes outwardly from the top 122, front 124 and back 125 surfaces of the chamber 118. The stiffening structures 132, 134 may divide the top surface 122 of the chamber 118 in substantially equal portions in the width direction W. The stiffening structures 132, 134 may tune the structural resonance frequencies of the chamber 118 away from the fan flutter frequencies to avoid fan flutter inducing resonance in the chamber 118. For example, the stiffening structures 132, 134 may tune the structural resonance frequencies of the relatively large, flat top surface 122 of the chamber 118 out of the targeted flutter frequency range. In addition, the stiffening structures 132, 134 add structural rigidity and may allow for a lightweight design of the chamber 118.

One or more weep holes 136 may be provided to allow for water or fluid egress. The placement of the weep holes 136 is selected to be below the engine centerline.

Figure 5:
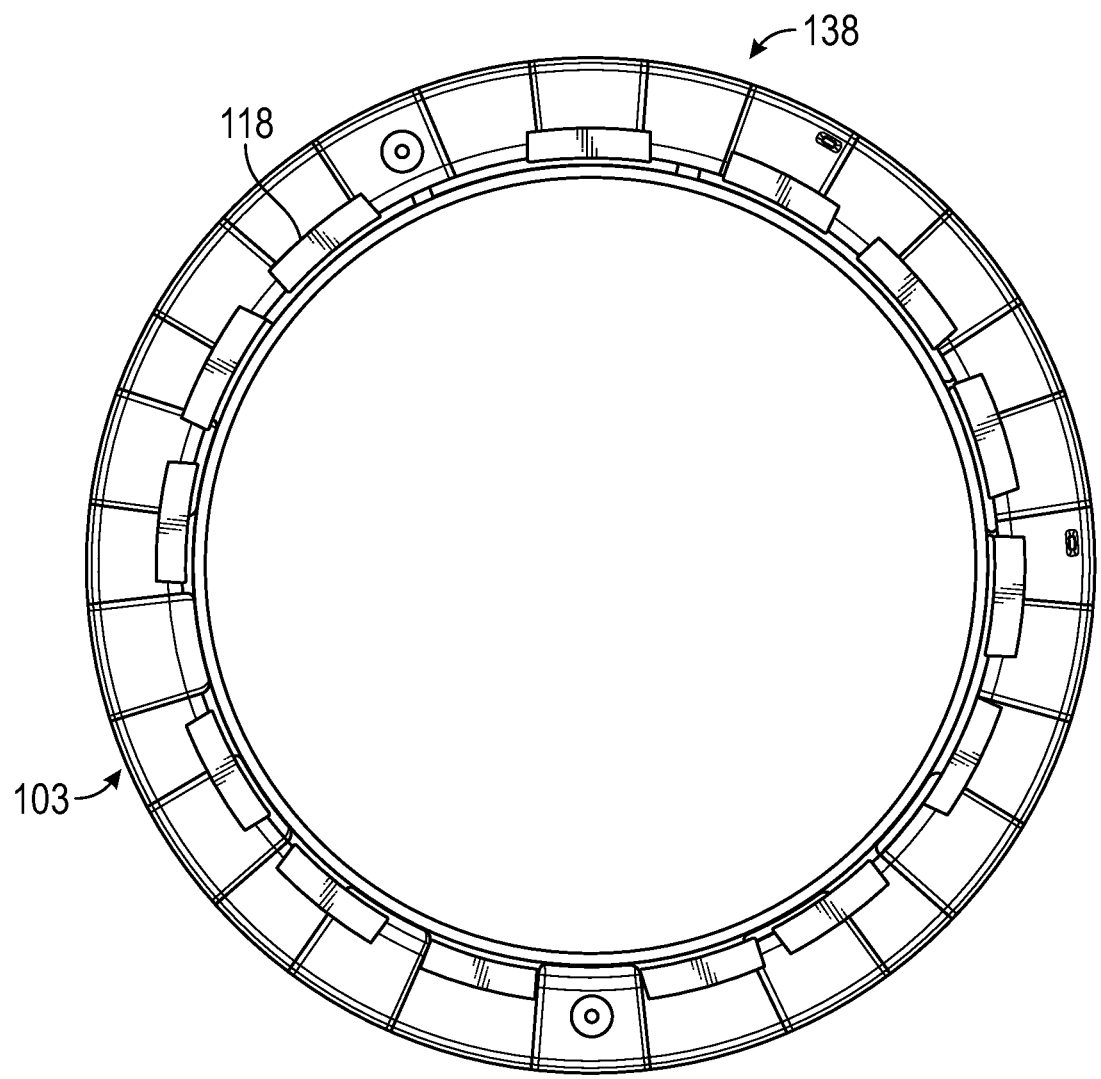
FIG. 5 illustrates an array of chambers of flutter dampers integrated into the nacelle inlet.
Figure 6:
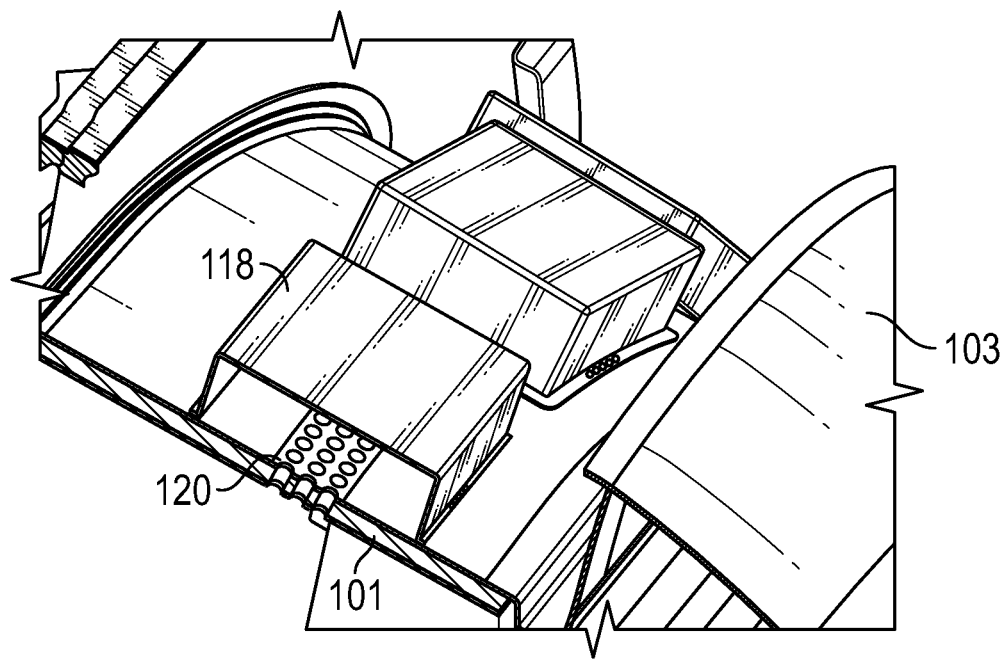
FIG. 6 is a perspective view of a portion of the nacelle inlet.

Turning now to FIGS. 5 and 6 a circumferential array 138 of chambers 118, including fourteen (14) chambers 118, is disposed about the nacelle inlet 103, with each of the chambers 118 having a perforated section. Disposing the chambers 118 in this type of circumferential array 138 achieves a desired damping volume.

Figure 7:
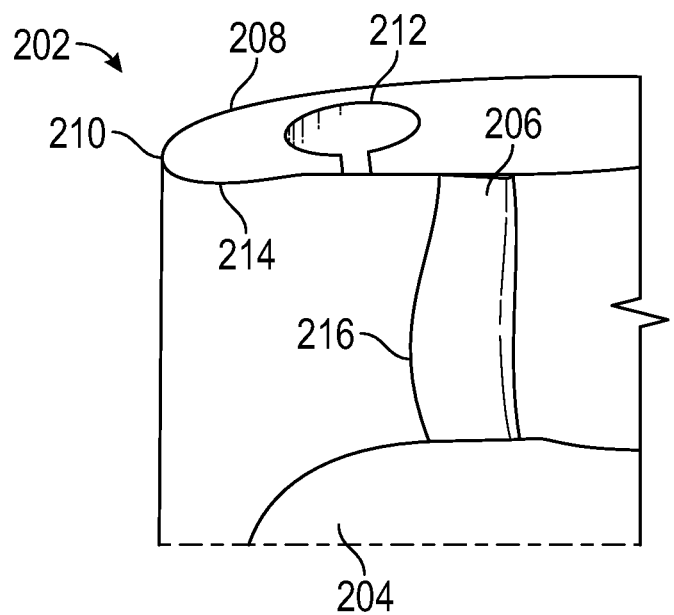
FIG. 7 illustrates another schematic view of a gas turbine propulsion system with a flutter damper in accordance with one embodiment of the disclosure.

Turning now to FIG. 7, illustrated is an intake area of an engine 202, which may include a nose cone 204, a fan having, e.g., a fan blade 206, and a nacelle 208 radially outside of the fan. Between the fan blade 206 and the hilite 210, or leading edge, of the nacelle 202 may be a chamber 212, functioning as a flutter-inhibiting device, or a plurality of chambers. The chamber 212 may modify the reflection characteristics of the intake at targeted frequencies. The chamber 212 may be located on the radially inner facing flow path surface, between the hilite 210 and a leading edge 216 of the fan blade 206.

Figure 8A:
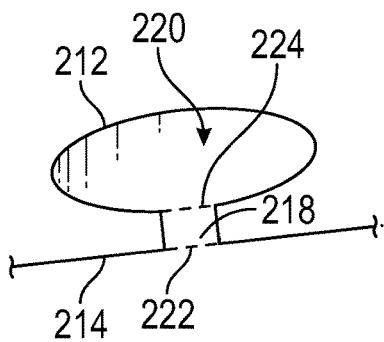
FIGS. 8A, 8B, and 8C illustrate flutter dampers in accordance with additional embodiments of the disclosure.
Figure 8B:
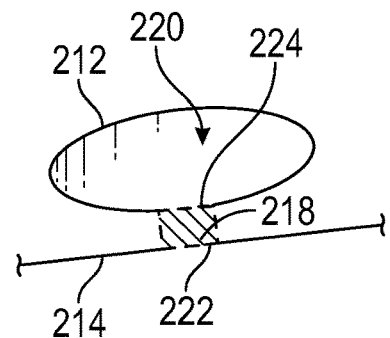
Figure 8C:
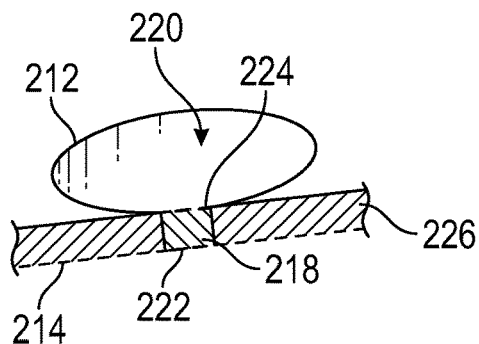

As illustrated in FIGS. 8A-8C, each chamber 212 may consist of one or more cavities, including, e.g., a first cavity 218 which may be fluidly connected to, and may communicate with, the main flow path 214, and a second cavity 220 that may be fluidly connected to, and radially outside of, the first cavity 218.

The first cavity 218, which may be radially closer to the main flow path 214, may be covered on a flow facing surface 222 of the first cavity 218, by a face sheet formed of a permeable structure. The permeable structure may be formed from a perforated plate, wire or fabric mesh, or other material that allows sound waves to propagate between the main flow path 214 and the first cavity 218.

The second cavity 220 may be fluidly connected to the first cavity 218 through a surface 224 formed by a sheet of similar permeable structure as used for surface 222. Either of the cavities 218, 220 may contain cellular structures, such as honeycomb or baffles, to control the direction of sound propagation of within the cavities.

In one embodiment, illustrated in FIG. 8B, the flutter damper may have a flow facing face sheet 222 that may be a perforated plate. The first cavity 218 may contain a cellular structure. A second cavity 220 may contain no cellular structure, and a second sheet 224 separating the first cavity 218 and second cavity 220 may be formed from a perforated plate.

In another embodiment, illustrated in FIG. 8C, the flow facing face sheet 222 may be comprised of the same permeable structure as the face sheet 214 of the surrounding acoustic liner 226. In addition, the cellular structure in the cavity 218 may be comprised of the same cellular structure as that in the surrounding acoustic liner 226.

Applying the above formulae, at certain target frequencies, the flutter damper may satisfy the following constraints at the flow facing surface 222:

$$R \geq 2\rho c$$

$$-3\rho c \leq X \leq -0.6\rho c$$

$$0.0143 \leq \frac{Vf_{target}}{Sc} \leq 0.165$$

Again, these values may vary and fall within the scope of the present disclosure. In the above equation, the volume of the flutter damper 212, which includes the volume of cavity 220 and the volume of cavity 218, is variable V, and the area encompassing the perforations in the second sheet 224 is the area S. For the exemplary rectangular embodiment previously shown in FIGS. 3 and 4, the volume V is equal to W×H×L plus Wp×H$_{Li}$×Lp, and the area S is equal to Lp×Wp. The units of V, S, c and f$_{target}$ are chosen such that $$\frac{Vf_{target}}{Sc}$$

is non-dimensional. As indicated, the flutter damper may be located along the surface 214 of the main flow path, between the hilite 210 and fan tip leading edge 216.

Further, as indicated above, the targeted frequencies for the flutter damper may be within a frequency range determined by:

f$_{S,ND}$=frequency of first or second bending mode of fan with ND nodal diameters $$1 \leq ND \leq 3$$

$$\Omega_{Mreltip=0.85} \leq \Omega \leq \Omega_{Mreltip=1.2}$$

$$f_{target} = f_{S,ND} + \Omega \cdot ND$$

Again, values for the frequency range may vary and fall within the scope of the present disclosure.

Moreover, as indicated above, the downstream edge of the flutter damper is located at B/D≤0.35 where the variable B is the distance between the downstream edge of the flutter damper 212 and the fan tip leading edge 216, and the variable D is the fan tip diameter at the leading edge 216 of the fan blade 206.

It is within the scope of the disclosed embodiments to dampen different frequencies with each of a plurality of chamber 212 installed in the nacelle 208.

Figure 9:
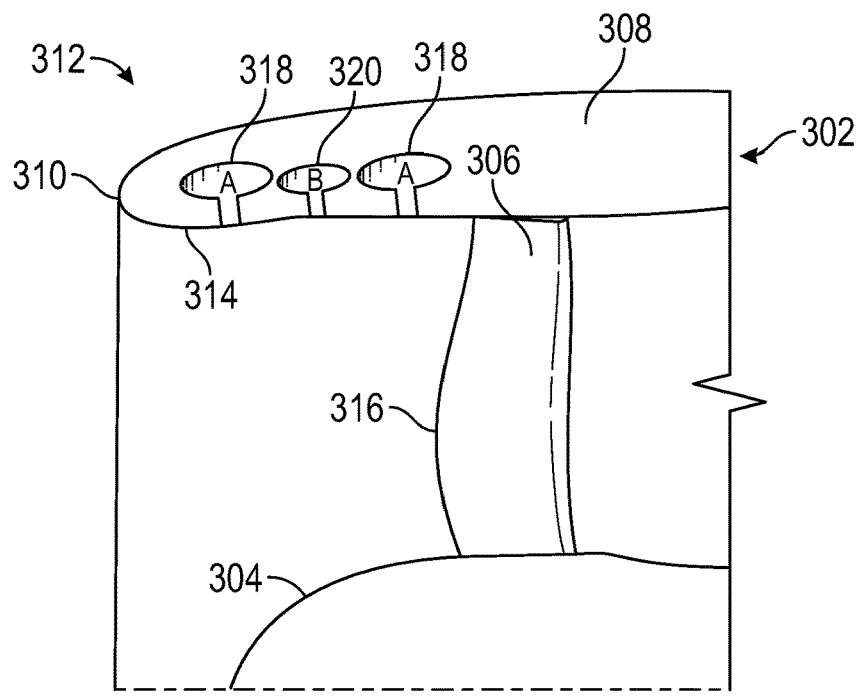
FIG. 9 illustrates another schematic view of a component of gas turbine propulsion system with a plurality of flutter dampers in accordance with one embodiment of the disclosure.

FIG. 9 illustrates an intake area of another engine 302, similar to the engines illustrated above, which may include a nose cone 304, a fan having, e.g., a fan blade 306, and a nacelle 308 radially outside of the fan. Between the fan blade 306 and the hilite 310, or leading edge of the nacelle 308, the engine 302 may include a flutter damper, which may include a plurality of chambers 312, which may inhibit fan flutter by modifying the reflection characteristics of the inlet flow at targeted frequencies. The plurality of chambers 312 may be located on the radially inner facing nacelle surface 314, i.e., the nacelle skin defining the flow path surface, between the hilite 310 and a leading edge 316 of the fan blade 306.

Figure 10:
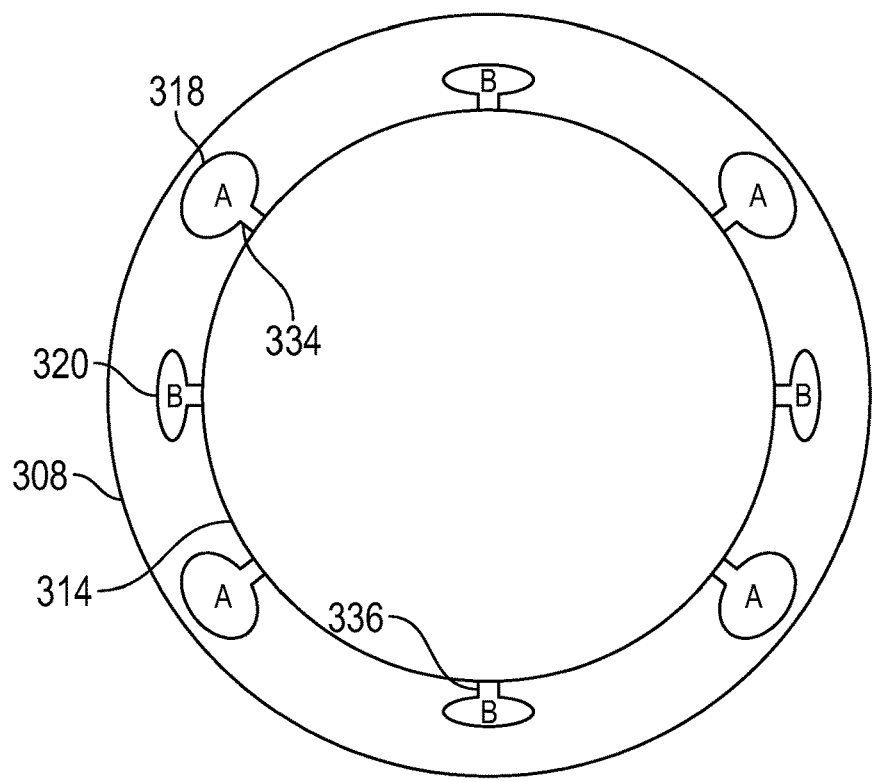
FIG. 10 illustrates another schematic view of a gas turbine propulsion system with a plurality of flutter dampers in accordance with one embodiment of the disclosure.
Figure 11:
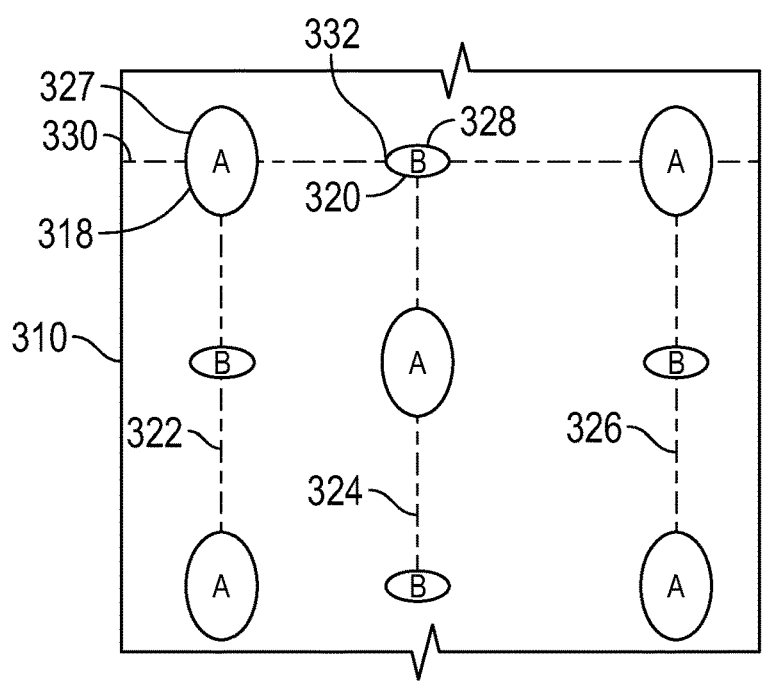
FIG. 11 illustrates another schematic view of a component of gas turbine propulsion system with a plurality of flutter dampers in accordance with one embodiment of the disclosure.

The plurality of chambers 312 may include a first set of chambers 318, labeled "A" in FIGS. 9-11, and a second set of chambers 320, labeled "B" in FIGS. 9-11. The first set of chambers 318 may be configured for peak acoustical energy absorption at a frequency range that is associated with a first fan flutter mode. The second set of chambers 320 may be configured for peak acoustical energy absorption at a frequency range that is associated with a second fan flutter mode. The total volume of dampers in each set 318, 320 provides the damping effect at the targeted frequency for the set.

As illustrated in FIG. 9-11, the two sets of chambers 318, 320 may be disposed along three axially spaced rows, forming a grid, or checkerboard pattern of chambers. The three rows may include a first row 322 closest to the hilite 310, a second row 324 axially aft of the first row 322, and a third row 326 axially aft of the second row 324. Per a checkerboard pattern, axial spacing between the first row 322 and second row 324 may be substantially the same as axial spacing between the second row 324 and the third row 326. Also per a checkerboard pattern, circumferential spacing between adjacent flutter dampers 312 may be substantially the same around the grid of chambers 312. Further per a checkerboard pattern, alignment between axially adjacent chambers 312 may be positioned so that center axes of each intersect.

Chambers from each set 318, 320 may be alternately disposed, axially and circumferentially, in the checkerboard format. This layout provides an intermixed arrangement of chambers 312. In addition, the chambers in each set 318, 320 may have an elliptically shaped portion 327, 328, for which a minor axis 330 for the first set of chambers 318 and a major axis 332 for the second set of chambers 320 may be disposed along a nacelle axial direction. In addition, the elliptically shaped portions 327, 328 of the chambers sets 318, 320 may be spaced from the flow surface by respective cylindrically shaped neck portions 334, 336. Further, the chambers in the first set of chambers 318 may have a greater volume than the chambers in the second set of chambers 320, to provide desired tuning characteristics.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flutter damper comprising:
a first plurality of chambers configured for peak acoustical energy absorption at a frequency range that is associated with a first fan flutter mode;
the first plurality of chambers in fluid communication with a flow surface; and
a second plurality of chambers configured for peak acoustical energy absorption at a frequency range that is associated with a second fan flutter mode;
the second plurality of chambers in fluid communication with the flow surface; and
wherein;
the flow surface is an annular surface disposed about an axis that extends in an axial direction; and
the first plurality of chambers and second plurality of chambers are axially and circumferentially intermixed, along a plurality of axially adjacent annular rows, to form a checkerboard pattern, and each chamber of the first plurality of chambers and the second plurality of chambers has an elliptically shaped portion, for which a minor axis for the first plurality of chambers and a major axis for the second plurality of chambers are disposed along the axial direction.

2. The flutter damper of claim 1, wherein the elliptically shaped portion of every chamber is spaced from the flow surface by a cylindrically shaped neck portion.

3. The flutter damper of claim 2, wherein the chambers in the first plurality of chambers have a greater volume than the chambers in the second plurality of chambers.

4. A gas turbine propulsion system comprising:
a nacelle; and
a flutter damper secured to the nacelle, the flutter damper comprising:
a first plurality of chambers configured for peak acoustical energy absorption at a frequency range that is associated with a first fan flutter mode;
the first plurality of chambers in fluid communication with a flow surface; and a second plurality of chambers configured for peak acoustical energy absorption at a frequency range that is associated with a second fan flutter mode;

the second plurality of chambers in fluid communication with the flow surface; and wherein;

the flow surface is an annular surface disposed about an axis that extends in a nacelle axial direction; and the first plurality of chambers and second plurality of chambers are axially and circumferentially intermixed, along a plurality of axially adjacent annular rows, to form a checkerboard pattern, and each chamber of the first plurality of chambers and the second plurality of chambers has an elliptically shaped portion, for which a minor axis for the first plurality of chambers and a major axis for the second plurality of chambers are disposed along the nacelle axial direction.

5. The gas turbine propulsion system of claim 4, wherein the elliptically shaped portion of every chamber is spaced from the flow surface by a cylindrically shaped neck portion.

6. The gas turbine propulsion system of claim 5, wherein the chambers in the first plurality of chambers have a greater volume than the chambers in the second plurality of chambers.

7. A method of providing flutter damping to a gas turbine engine, comprising:

absorbing acoustic energy with a first plurality of chambers in fluid communication with a flow surface and configured for peak acoustical energy absorption at a frequency range that is associated with a first fan flutter mode; and absorbing acoustic energy with a second plurality of chambers configured for peak acoustical energy absorption at a frequency range that is associated with a second fan flutter mode; and wherein;

the flow surface is an annular surface disposed about an axis that extends in axial direction; and the first plurality of chambers and second plurality of chambers are axially and circumferentially intermixed, along a plurality of axially adjacent annular rows, to form a checkerboard pattern, and each chamber of the first plurality of chambers and the second plurality of chambers has an elliptically shaped portion, for which a minor axis for the first plurality of chambers and a major axis for the second plurality of chambers are disposed along the nacelle axial direction.

8. The method of claim 7, wherein the elliptically shaped portion of every chamber is spaced from the flow surface by a cylindrically shaped neck portion.

* * * * *